United States Patent [19]

Sano et al.

[11] Patent Number: 4,843,142
[45] Date of Patent: Jun. 27, 1989

[54] CATALYTIC PROCESS FOR PRODUCING CROSS-LINKED RESIN FROM PHENOLIC COMPOUND AND BIS-OXAZOLINE

[75] Inventors: Yasuo Sano, Minoo; Kouichi Shirahama, Toyonaka; Takahiko Hirono, Amagasaki, all of Japan

[73] Assignee: Takeda Chemical Industries, Ltd., Osaka, Japan

[21] Appl. No.: 947,412

[22] Filed: Dec. 24, 1986

[30] Foreign Application Priority Data

Dec. 27, 1985 [JP] Japan ............................... 60-296959
Jun. 30, 1986 [JP] Japan ............................... 61-154783

[51] Int. Cl.$^4$ ..................... C08G 65/40; C08G 69/44
[52] U.S. Cl. ...................................... 528/211; 525/61; 525/504; 528/126; 528/141
[58] Field of Search ................. 528/211, 126, 141; 525/61, 504

[56] References Cited

U.S. PATENT DOCUMENTS

| | | | |
|---|---|---|---|
| 4,195,154 | 3/1980 | Kaiser et al. | 525/504 |
| 4,430,491 | 2/1984 | Culbertson et al. | 528/211 |
| 4,613,662 | 9/1986 | Goel | 528/211 |
| 4,699,970 | 10/1987 | Tiba et al. | 528/211 |
| 4,748,230 | 5/1988 | Tiba et al. | 528/211 |
| 4,764,587 | 8/1988 | Sano et al. | 528/211 |

Primary Examiner—Harold D. Anderson
Attorney, Agent, or Firm—Wenderoth, Lind & Ponack

[57] ABSTRACT

A process for producing a cross-linked resin which comprises: reacting at least one phenolic reactant selected from the group consisting of
 (a) a compound having phenolic hydroxyls and having the general formula:

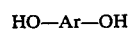

HO—Ar—OH wherein Ar represents a divalent aromatic group composed of single or condensed aromatic rings, or a divalent aromatic group composed of two or more aromatic rings connected by C—C covalent bond, or a divalent aromatic group composed of two or more aromatic rings connected by a divalent hydrocarbon group or a divalent group selected from the group consisting of carbonyl, thioether, ether and amide group, and wherein the aromatic ring may bear additional hydroxyls or substituents which are inactive to the bis(2-oxazoline) compound, and
 (b) a polymer having not less than two phenolic hydroxyls in the molecule.

with a bis(2-oxazoline) compound in a molar ratio of the bis(2-oxazoline) compound to the phenolic reactant not less than about 1, in the presence of a catalyst selected from the group consisting of phosphorous acid, organic phosphites and oxazoline ring-opening polymerization catalysts at elevated temperatures.

9 Claims, No Drawings

CATALYTIC PROCESS FOR PRODUCING CROSS-LINKED RESIN FROM PHENOLIC COMPOUND AND BIS-OXAZOLINE

This invention relates to cross-linked resins and a process for producing the same.

It is already known, as disclosed in U.S. Pat. No. 3,476,712, that the reaction of a bis(2-oxazoline) compound with a dicarboxylic acid in an equimolar amount under heating produces linear polyesteramides.

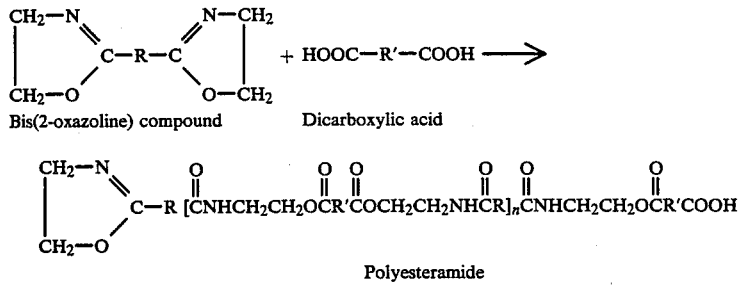

Bis(2-oxazoline) compound    Dicarboxylic acid

Polyesteramide

It is further known that the reaction of bis(2-oxazoline) compound with a dicarboxylic acid in molar ratios of the bis(2-oxazoline) compound to the dicarboxylic acid of not more than about 1 in the presence of a catalyst such as organic phosphites to provide a cross-linked resin, as disclosed in U.S. Pat. No. 4,474,942.

On the other hand, it is also known that the reaction of a bis(2-oxazoline) compound with a compound having two phenolic hydroxyls in the molecule produces a thermoplastic resin, as disclosed in U.S. Pat. No. 4,430,491, and also that the reaction of a bis(2-oxazoline) compound with either a compound having three or more phenolic hydroxyls in the molecule or a phenol-formaldehyde low-molecular weight primary condensate under heating produces a thermosetting resin by ring-opening addition reaction of oxazoline rings initiated by the phenolic hydroxyl. It is further disclosed that the use of a transition metal salt, typically zinc acetate, as a catalyst accelerates the reaction.

The present inventors have made an intensive investigation on the reaction of a bis(2-oxazoline) compound with a phenolic compound, and have found out novel catalysts in the presence of which the bis(2-oxazoline) compound reactd with the phenolic compound to readily provide a a novel three-dimensionally cross-linked resin which is transparent, and substantially colorless or very little colored, and has especially a high heat-resistance and a very small water-absorption.

It is therefore an object of the invention to provide a novel cross-linked resin and a process for producing the same.

The cross-linked resin of the invention is produced by reacting at least one phenolic reactant selected from the group consisting of (a) a compound having phenolic hydroxyls and having the general formula:

HO—Ar—OH wherein Ar represents a divalent aromatic group composed of single or condensed aromatic rings, or a divalent aromatic group composed of two or more aromatic rings connected by C—C covalent bond, or a divalent aromatic group composed of two or more aromatic rings connected by a divalent hydrocarbon group or a divalent group selected from the group consisting of carbonyl, thioether, ether and amide group, and wherein the aromatic ring may bear additional hydoxyls or substituents which are inactive to the bis(2-oxazxoline) compound, and (b) a polymer having not less than two phenolic hydroxyls in the molecule, with a bis(2-oxazoline) compound in a molar ratio of the bis(2-oxazoline) compound to the phenolic reactant of not less than about 1, in the presence of a catalyst selected from the group consisting of phosphorous acid, organic phosphites and oxazoline ring-opening polymerization catalysts at elevated temperatures.

The process for producing cross-linked resins of the invention comprises: reacting at least one phenolic reactant selected from the group consisting of (a) a compound having phenolic hydroxyls and having the general formula:

HO—Ar—OH wherein Ar represents a divalent aromatic group composed of single or condensed aromatic rings, or a divalent aromatic group composed of two or more aromatic rings connected by C—C covalent bond, or a divalent aromatic group composed of two or more aromatic rings connected by a divalent hydrocarbon group or a divalent group selected from the group consisting of carbonyl, thioether, ether and amide group, and wherein the aromatic ring may bear additional hydroxyls or substituents which are inactive to the bis(2-oxazoline) compound, and (b) a polymer having not less than two phenolic hydroxyls in the molecule, with a bis(2-oxazoline) compound in a molar ratio of the bis(2-oxazoline) compound to the phenolic reactant of not less than about 1, in the presence of a catalyst selected from the group consisting of phosphorous acid, organic phosphites and oxazoline ring-opening polymerization catalysts at elevated temperatures.

In the reaction of the bis(2-oxazoline) compound with the phenolic reactant in the presence of phosphorous acid or organic phosphites as a catalyst according to the invention, oxazoline rings undergo ring-opening addition reactions to phenolic hydroxyls to form etheramide linkages, and oxazoline rings further undergo ring-opening addition reactions to the etheramide linkage, thereby to provide a three-dimensionally cross-linked resin. Further in the reaction of the invention in which an oxazoline ring-opening polymerization catalyst us used as a catalyst, there take place concurrently the ring-opening polymerization reaction of oxazoline rings and the ring opening addition reaction of oxazoline rings, thereby to form a three-dimensionally cross-linked resin.

In particular, it is surprising that the reaction of the phenolic compound which has two phenolic hydroxyls in the molecule with the bis(2-oxazoline) compound by use of the catalyst specified as above provides three-dimensionally cross-linked resins according to the invention.

The thus resultant resins have a large mechanical strength and a small water absorption in particular as well as an excellent toughness and resistance to chemicals, and moreover the resin is transparent, and substantially colorless or very little if colored.

The bis(2-oxazoline) compound used in the present invention has the general formula:

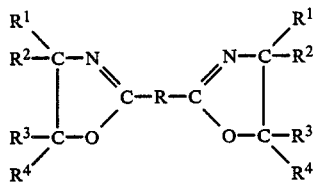

wherein R represents a C—C covalent bond or a divalent hydrocarbon group, preferably an alkylene, a cycloalkylene or an arylene, e.g., phenylene, and $R^1$, $R^2$, $R^3$ and $R^4$ independently represent hydrogen, an alkyl or an aryl. In the case where R is a C—C covalent bond, the bis(2-oxazoline) compound may be 2,2'-bis(2-oxazoline), 2,2'-bis(4-methyl-2-oxazoline) or 2,2'-bis(5-methyl-2-oxazoline). Examples of the bis(2-oxazoline) compound wherein R is a hydrocarbon group are 1,2-bis(2-oxazolinyl-2)hexane, 1,4-bis(2-oxazolinyl-2)butane, 1,6-bis(2-oxazolinyl-2)hexane, 1,8-bis(2-oxazolinyl-2)octane, 1,4-bis(2-oxazolinyl-2)-cyclohexane, 1,2-bis(2-oxazolinyl-2)benzene, 1,3-bis(2oxazolinyl-2)benzene, 1,4-bis(2-oxazolinyl-2)benzene, 1,2-bis(5-methyl-2-oxazolinyl-2)benzene, 1,3-bis(5-methyl-2-oxazolinyl-2)benzene, 1,4-bis(5-methyl-2-oxazolinyl-2)-benzene and 1,4-bis(4,4'-dimethyl-2-oxazolinyl-2)benzene. These may be used as a mixture of two or more.

According to the invention, the bis(2-oxazoline) compound is reacted with a phenolic reactant selected from the group consisting of:
(a) a compound having phenolic hydroxyls and having the general formula:

wherein Ar represents a divalent aromatic group composed of single or condensed aromatic rings, or a divalent aromatic grouip composed of two or more aromtic rings connected by C—C covalent bond, or a divalet aromatic group composed of two or more aromatic rings connected by a divalent hydrocarbon group or a divalent group selected from the group consisting of carbonyl, thioether, ether and amide group, and wherein the aromatic ring may bear additional hydroxyls or substituents which are inactive to the bis(2-oxazoline) compound, and
(b) a polymer having not less than two phenolic hydroxyls in the molecule.

The Ar group in the above general formula is a divalent aromatic group, and may be, for example, composed of a single aromatic ring or condensed aromatic rings. Examples of the phenolic reactant which has such a divalent aromatic group include, for instance, dihydroxybenzenes and dihydroxynaphthalenes such as hydroquinone, resorcinol and 1,4-dihydroxynaphthalene. The Ar group may also be a divalent aromatic group composed of two or more aromatic rings connected by C—C covalent bond. A representative example of the phenolic reactant in which the Ar group is such as above is 2,2'-dihydroxybisphenol.

The Ar group in the above general formula may further be a divalent aromatic group in which two or more aromatic rings are connected with each other by divalent hydrocarbon groups which may bealkylenes, arylenes or cycloalkylenes. There may be mentioned as examples of the phenolic reactant having such Ar groups, 2,2'-methylene bisphenol, 4,4'-methylene bisphenol (bisphenol F), 4,4'-(1-methyl-ethylidene) bisphenol (bisphenol A), 4,4'-(phenylmethylene) bisphenol and 4,4'-(cyclohexanediyl) bisphenol.

Further the Ar group may be composed of two or more aromatic rings connected by a carbonyl group, and an example of the phenolic reactant having such an Ar group may be 4,4'-dihydroxybenzophenone. In the same way, 2,2'-dihydroxydiphenyl thioether is an example of the phenolic reactant in which the Ar group is composed of two or more aromatic rings connected by a thioether group; 2,2'-dihydroxydiphenyl ether is an example of the phenolic reactant in which the Ar group is composed of two or more aromatic rings connected by an ether group; and 2-hydroxy-N-(4-hydroxyphenyl)benzamide diphenyl ether is an example of the phenolic reactant in which the Ar group is composed of two or more aromatic rings connected by an amide group.

The phenolic reactant may be substituted on either of the aromatic rings by additional hydroxyls, and further one or more substitutents which are inactive to the bis(2-oxazoline) compound. The substituents therefore include alkyls, aryls, halogens, cyanos, nitros, alkoxyls or aryloxyls.

According to the invention, a polymer which has two or more phenolic hydroxyls in the molecule may also be used as the phenolic reactant. This phenolic polymer may be singly or in combination with the phenolic compound reacted with the bis(2-oxazoline) compound. Examples of the phenolic polymer include novolac resins and resol resins which are, as well known, primary condensates of phenols and formaldehyde by an acid and an alkali catalyst, respectively. Polyvinylphenols are also usable as the phenolic polymer. Among these phenolic polymers' the novolac resin is most preferred in the invention.

The bis-(2-oxazoline) compound is reacted with the phenolic reactant in molar ratios of the bis(2-oxazoline) compound to the phenolic reactant hydroxyls in the molecule, the bis(2-oxazoline) compound is reacted with the phenolic compound preferably in molar ratios of the bis(2-oxazoline) compound to the phenolic reactant of about 1–3, and most preferably of about 1.1–2 so as to produce cross-linked resins having desired properties.

When the phenolic reactant which has two phenolic hydroxyls is reacted with the bis(2-oxazoline) compound in the presence of phosphorous acid or organic phosphites, cross-linked resins are obtained by the reaction as below:

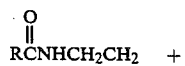

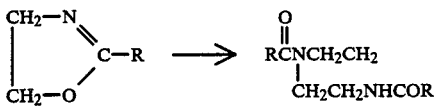

According to the reaction of the invention, as represented as above, it is likely that there is first formed a polymer having etheramide linkages in the polymer chain, corresponding to the formation of the polyesteramide in the prior art as described hereinbefore, and then the bis(2-oxazoline) compound undergoes the ring-opening addition reaction to the nitrogen atom in the etheramide linkage in the polymer chain in the presence of phosphorous acid or organic phosphites, to form oxazoline rings as pendants from the polymer chain, which in turn undergoes the ring-opening addition reaction to the phenolic reactant or other etheramide linkages in the other polymers, thereby to produce cross-linked polymers of three dimensional structures.

On the other hand, when the oxazoline ring opening polymerization catalyst is used, it is likely that both the ring-opening polymerization reaction of oxazoline rings and the ring-opening addition reaction of oxazoline rings to phenolic hydroxyls concurrently take place, to produce three-dimensionally cross-linked resins.

According to the invention, the phenolic reactant may be in part substituted with a substitution reactant compound such as a polybasic carboxylic acid, an acid anhydride, an acid anhydride having free carboxyls in the molecule and/or an aromatic hydroxy-carboxylic acid.

The amount in which the phenolic reactant is substituted with the substitution reactant is not specifically limited, but the amount is usually about 1–99 mole % of the phenolic reactant, preferably about 5–95 mole %. In this case also in which the substitution reactant is used, the bis(2-oxazoline) compound is reacted with the phenolic reactant and the substitution reactant in molar ratios of the bis(2-oxazoline) compound to the total of the phenolic reactant and the substitution reactant of not less than about 1.

The polybasicarboxylic acid usable in the invention includes aliphatic dicarboxylic acids such as malonic acid, succinic acid, glutaric acid, adipic acid, pimelic acid, suberic acid, azelaic acid, sebacic acid, dodecandioic acid, dimer acid or eicosandioic acid; aromatic dicarboxylic acids such as phthatlic acid, isophthalic acid, terephthalic acid, naphthalenedicarboxylic acid, diphenylsulfonedicarboxylic acid or diphenylmethanedicarboxylic acid; tribasic carboxylic acids or more polybasic carboxylic acids such as trimellitic acid, trimesic acid, pyromellitic acid or butane-1,2,3,4-tetracarboxylic acid. These may be used singly or as a mixture of two or more.

The acid anhydride usable in the invention includes succinic anhydride, maleic anhydride, itaconic anhydride, phthalic anhydride, tetrahydrophthalic anhydride, hexahydrophthalic anhydride, endomethylene tetrahydrophthalic anhydride, tetrachlorophthalic anhydride, tetrabromophthalic anhydride, pyromellitic anhydride, 4,4'-benzophenone tetracarboxylic acid dianhydride. These anhydrides may also be used singly or as a mixture of two or more.

The acid anhydride having one or more free carboxyls usable in the invention includes trimellitic anhydride.

Among these subsitution reactants as above, the aliphatic dicrboxylic acid and aromatic carboxylic acid anhydrides are preferred.

The aromatic hydroxy-carboxylic acid used in the invention includes benzene derivatives, for example, salicylic acid, m-hydroxybenzoic acid, p-hydroxybenzoic acid, o-cresotic aicd, gallic acid, mandelic acid and tropic acid, and naphthalene derivatives, for example, α-hydroxynaphthoic acid and β-hydroxynaphthoic acid. These compounds may be used singly or as a mixture of two or more.

According to the invention, the reaction of the bis(2-oxazoline) compound with the phenolic reactant which may be in part displaced by the substitution reactant is carried out in the presence of a catalyst selected from the group consisting of phosphorous acid, organic phosphites and oxazoline ring-opening polymerization catalysts.

The organic phosphite used is either mono-, di- or triester. The monoester includes monophenyl phosphite, mono(chlorophenyl) phosphite, mono(nonylphenyl) phosphite and mono(2,4-di-tert.-butylphenyl) phosphite; the diester includes diphenyl phosphite and bis(-chlorophenyl) phosphite and the triester includes triphenyl phosphite, tris(nonylphenyl) phosphite, tris(4-chlorophenyl) phosphite, triethyl phosphite, tri-n-butyl phosphite, tris(2-ethylhexyl) phosphite, tristearyl phosphite, diphenylmonodecyl phosphite, tetraphenyl dipropyleneglycol diphosphite, tetraphenyltetra-(tridecyl)pentaerythriol tetraphosphite, 4,4'-butylidene-bis-(3-methyl-6-t-butylphenyl-ditridecyl) phosphite or bisphenol A pentaerythritol phosphite. These may be used singly or as a mixture of two or more.

Among these phosphites are particularly preferred those which have phenoxy or substituted phenoxy groups, for example, monophenyl phosphite, diphenyl phosphite and triphenyl phosphite. In particular, monophenyl phosphite is most preferred since it has a high catalytic activity and cures and resin materials in a very short time.

The oxazoline ring-opening polymerization catalyst is already known, as described in, for example, Poymer J., Vol. 3, No. 1, pp. 35–39 (1972) and Polymerization Reaction Treatize Course 7, Ring-Opening Polymerization II, pp. 159–164, Kagaku Dojin (1973). In the reaction of the invention, a strong acid, a sulfonic acid ester, a sulfuric acid ester or an organic halide which contains at least one halomethyl group in the molecule is suitable as the oxazoline ring-opening polymerization catalyst.

More specifically, the strong acid includes an oxoacid such as phosphorous acid, sulfuric acid or nitric acid, a hydroacid such as hydrochloric acid or hydrogen sulfide, and an organic strong acid such as phenyl phosphorous acid, methanesulfonic acid, benzenesulfonic acid, p-toluenesulfonic acid, dodecylbenzenesulfonic acid, naphthalene-α-sulfonic acid, naphthalene-β-sulfonic acid, sulfanilic aicd or phenylphosphonic acid.

The sulfonic acid ester includes methyl p-toluenesulfonate and ethyl p-toluenesulfonate. The sulfuric acid ester includes dimethylsulfate and diethylsulfate.

Preferred examples of the organic halide as defined before are a monohaloalkane and a polyhaloalkane such as methyl iodide, butyl chloride, butyl bromide, butyl iodide, lauryl bromide, allyl bromide or ethane tetrabromide. Other examples of the organic halide are monoor polyhalomethylbenzenes, e.g., benzyl bromide and p,p'-dichloromethylbenzene. The organic halide as the catalyst further includes a haloalkane which has a hydroxyl and/or a carboxyl group in the molecule, such as α-bromopropionic acid, 2,3-dibromopropanol or α-bromobutyric acid.

Among the above catalysts, the phosphorous acid ester and sulfonic acid ester are preferred.

The catalyst is used in amounts of 0.1–5% by weight, preferably 0.3–3% by weight based on the weight of the resin materials, namely, the mixture of the bis(2-oxazoline) compound and the phenolic reactant, which may be in part displaced by the substitution reactant.

The reaction temperature depends on the individual bis(2-oxazoline) compound and reactant used as well as the catalyst used, and hence it is not specifically limited, however, usually it is not lower than about 100° C., preferably in the range of about 120° C. to 300° C., and most preferably in the range of about 150° C. to 250° C. The reaction time for the resin material is cure to form three-dimensionally resin also varies depending on the individual reactants as well as the catalyst used, but usually in the range of about 1 minute to 2 hours.

According to the invention, there is provided a resin composition which comprises the cross-linked resin as obtained as above and reinforcements and/or fillers combined therewith.

As the reinforcement, fibrous reinforcements which are used in the production of ordinary fiber reinforced resins are preferable. Specific examples of such fibrous reinforcements are inorganic fibers such as glass fibers, carbon fibers, quartz fibers, ceramic fibers, zirconia fibers, boron fibers, tungsten fibers, molybdenum fibers, steel fibers, berylium fibers and asbestos fibers, natural fibers such as cotton, flax, hemp, jute or sisal hemp, and synthetic fibers having heat-resistance at the reaction temperature such as polyamide fibers or polyester fibers. In order to improve the adhesion to the cross-linked resin, the fibrous reinforcement may be treated in advance with, for example, chromium compounds, silane, vinyltriethoxysilane or aminosilane. These fibrous reinforcements may be used singly or in combination of two or more. Also the reinforcement may be used in various forms, for example, strands, mats, fabrics, tapes or short fibers of a uniform length. The combined use of the fibrous reinforcement of two or more of the forms may be adopted when desired.

The amount of the reinforcement may be selected, for example, upon the viscosity of the resin material, the reinforcement used, the requirements for cured products, etc., however, it is usually in the range of about 3–95% by weight, preferably about 5–80% by weight based on the resin composition.

Various fillers may also be incorporated into the cross-linked resin. Preferred examples of the filler include oxides such as silica, alumina or titanium dioxide, hydroxides such as aluminum hydroxide, carbonates such as calcium carbonate or magnesium carbonate, silicates such as talc, clay, glass beads or bentonite, carbon materials such as carbon black, metal powders such as iron powder or aluminum powder. The amount of the filler may be selected as in the case of the reinforcement, and it is usually in the range of about 3–95% by weight, preferably about 10–80% by weight based on the resin composition.

The resin composition may further contain any additive, e.g., stabilizers, pigments, fire retardants and the like which are used in ordinary thermosetting resin composition.

The resin composition is obtained by heating a cross-linkable composition of the invention which contains the bis(2-oxazoline) compound, the phenolic reactant which may be in part substituted with the substitution reactant, the catalyst, and the reinforcement and/or fillers. The heating of this cross-linkable composition provides a cross-linked resin composition combined with the reinforcement and/or filler.

The cross-linkable composition is obtainable, for example, by heating a mixture of the resin material and the catlyst, to fluidise the mixture, and then by mixing or impregnating the reinforcement and/or filler with the fluidised mixture. The catalyst may be added to and mixed with the resin material after it has melted, and then the fluidised mixture is applied to the reinforcement and/or filler. The cross-linkable composition is suitably used as a molding material in various molding processes.

For the production of the fiber reinforced crosslinked resin in particular, any known method is adoptable. By way of example, the fluidized molding material as above is injected into fibrous reinforcements disposed in a mold to impregnate the reinforcement with the molding material, and then is heated under a pressure, as in the preform matched metal die process or resin injection process; the molding material is mixed and kneaded with fibrous reinforcements of a uniform length, and the resultant mixture is disposed or injected into a mold, followed by heating under a pressure, as in the bulk molding compound process, transfer process, injection molding or RIM process; or fibrous reinforcements are impregnated with the molding material to form a prepreg, which is then heated under a pressure, as in the SMC process or prepreg cloth process.

In molding the cross-linkable composition, the molding temperature is usually about 160°–230° C., and the molding time is usually 1 minute to 1 hour, although it varies depending on the reactants and the catalyst used as well as the molding temperature.

The resin composition of the invention combined with the reinforcement and/or filler, especially the fibrous reinforcement, has excellent properties over conventional fiber reinforced resins which are ever known, since the composition retains high mechanical strength and high heatresistance of the cross-linked resin as a matrix resin.

Therefore, the resin composition of the invention finds application not only in the application field for conventional fiber-reinforced or filler-containing plastics, such as applications of aircraft, raft, railway vehicles, automobiles, civil engineering, construction and building, electrical and electronic appliances, anti-corrosion equipment, sporting and leisure goods, medical and industrial parts, but also in applications where conventional fiber-reinforced and filler-containing plastics have failed to achieve application development.

As above set forth, the reaction according to the invention of the bis(2-oxazoline) compound with the phenolic reactant in the presence of the catalyst as specified hereinbefore at elevated temperatures readily provides in a few minutes to a few hours to cross-linked resins which are transparent, and substantially colorless or very little if colored, hard, infusible and undissolvable in organic solvents, and further which has a very small water absorption, a high mechanical strength and toughness, and an excellent resistance to heat.

The present invention will be more easily understood with reference to the following examples, which however are intended to illustrate the invention only and are not to be construed as limiting the scope of the invention. In the example, the thermal deflection temperature was measured under a load of 18.6 kg applied to a sample resin sheet, and the water absorption was measured by the increase in weight of a sample in the form of disc after immersing in water at 23° C. for 24 hours.

EXAMPLE 1

A mixture of 58.7 g (0.27 mole) of 1,3-bis(2-oxazolinyl-2)benzene and 41.3 g (0.18 mole) of bisphenol A was heated to about 150° C. to melt together, and then 1.0 g of phosphorous acid was added to the melt. The mixture was then poured into a mold which had a cavity of 3 mm in width which had been in advance heated to 200° C., and then was left standing in an oven at 200° C. for 30 minutes to allow the mixture to form a crosslinked resin.

After cooling, the cured sheet of 3 mm in thickness was taken out of the mold. The cured resin was transparent, and very slightly yellow, hard, infusible and undissolvable in organic solvents. The properties of the resin are as follows:
Thermal deflection temperature: 129° C.
Hardness by a Barcol impressor: 52
Flexural strength: 13.2 kgf/mm$^2$
Flexural modulas: 447 kgf/mm$^2$

REFERENCE EXAMPLE

The mixture which contained no catalyst therein but was otherwise the same as in Example 1 was heated in a mold at 200° C. for 2 hours, but the mixture was found to remain liquid, and no cured resin was obtained.

EXAMPLE 2

A mixture of 40 g (0.185 mole) of 1,3-bis(2-oxazolinyl-2)benzene and 60 g of novolac phenol resin (Phenol Resin BRG-557 by Showa Kobunshi K.K., Japan) was heated in an oil bath of about 180° C. When the mixture reached a temperature of 130°–150° C. and melted together, 1.0 g of monophenyl phosphite was added to the melt. The melt was left standing in an oven at 200° C. for 1 hour to allow the mixture to form a cured sheet.

The resultant cured sheet of 3 mm in thickness was very slightly yellow, transparent, infusible and undissolvable. The properties of the resin are as follows:
Thermal deflection temperature: 138° C.
Hardness by a Barcol impressor: 59
Flexural strength: 15.0 kgf/mm$^2$
Flexural modulas: 565 kgf/mm$^2$
Water absorption: 0.10%

EXAMPLE 3

A mixture of 64.9 g (0.30 mole) of 1,3-bis(2-oxazolinyl-2)benzene, 20 g (0.10 mole) of bisphenol F and 13.8 g (0.10 mole) of p-hydroxybenzoic acid was heated to about 120° C. in an oil bath of about 150° C. to melt together. Then 0.6 g of monophenyl phosphite was added to the melt, and the mixture was poured into the same mold as in Example 1 in advance heated, and then was left standing in an oven at 180° C. for 1 hour to allow the mixture to form a cross-linked resin.

The resultant cured sheet of 3 mm in thickness was very slightly yellow, transparent, infusible and undissolvable. The thermal deflection temperature was found 157° C.

EXAMPLE 4

A mixture of 63.2 g (0.29 mole) of 1,3-bis(2-oxazolinyl-2)benzene, 22.3 g (0.098 mole) of bisphenol A, 8.55 g (0.059 mole) of adipic acid and 5.78 g (0.039 mole) of phthalic anhydride was heated in an oil bath of about 160° C. The mixture melted together when it reached a temperature of about 140° C. To the resultant melt was added 1.0 g of phosphorus acid, the mixture was stirred, and then was poured into the same mold as in Example 1 in advance heated, and then was left standing in an oven at 180° C. for 1 hour to allow the mixture to form a crosslinked resin.

The resultant cured sheet of 3 mm in thickness was very slightly yellow, transparent, infusible and undissolvable. The thermal deflection temperature was found 141° C.

EXAMPLE 5

A mixture of 48.0 g (0.222 mole) of 1,3-bis(2-oxazolinyl-2)benzene, 16.8 g (0.074 mole) of bisphenol A and 15.2 g of the same novolac phenol resin as before was heated in an oil bath of about 160° C. to melt together. The mixture was cooled to about 140° C., and then was mixed with 0.8 g of phosphorous acid.

A mold (18 cm×18 cm) which had been in advance heated to 170° C. was placed on a press, and thereon were placed a mat of continuous long glass filaments (M1600 by Asahi Fibers Glass K.K., Japan). The melt mixture was poured into the glass fiber mat, the press was closed, and the melt was allowed to cure for 1 hour under a pressure of 30 kg/cm$^2$, to provide a fiber-reinforced plastic sheet.

The fiber-reinforced plastic sheet was of 3 mm in thickness and contained glass fibers in an amount of 65%. The properties are as below:
Tensile strength: 21.9 kgf/mm$^2$
Flexural stength: 44.8 kgf/mm$^2$
Flexural modulas: 1920 kgf/mm$^2$
Izod impact strength (with a notch): 151 kg.cm/cm

EXAMPLE 6

A fiber-reinforced plastic sheet of 3 mm in thickness and containing glass fibers in an amount of 64% was prepared by use of a glass mat made of glass fibers of 2 inches in strength (Nippon Sheet Glass k.k., Japan) in the same manner as in Example 5. The properties of the resultant fiberreinforced plastic sheet are as follows:
Tensile strength: 28.4 kgf/mm$^2$
Flexural strength: 45.8 kgf/mm$^2$
Flexural modulas: 1930 kgf/mm$^2$
Izod impact strength (with a notch): 184 kg.cm/cm$^2$

EXAMPLE 7

A mixture of 58.7 g (0.27 mole) of 1,3-bis(2-oxazolinyl-2)benzene and 41.3 g (0.18 mole) of bisphenol A was heated to about 160° C. to melt together, and 1.0 g of diphenyl phosphite was added to the melt. The mixture was poured into the same mold as in Example 1 which had been in advance heated, and then was left standing in an oven at 200° C. for 2 hours to allow the mixture to form a crosslinked resin.

The resultant cured sheet of 3 mm in thickness was infusible and undissolvable, and had the properties as follows:
Thermal deflection temperature: 127° C.
Hardness by a Barcol impressor: 52
Flexural strength: 13.4 kgf/mm$^2$
Flexural modulas: 442 kgf/mm$^2$

EXAMPLE 8

A mixture of 16 g of 1,3-bis(2-oxazolinyl-2)benzene and 24 g of the same novolac phenol resin as in Example was heated in two test tubes in an oil bath of 180° C., respectively. The mixture melted together when it reached a temperature of 130° C.

Then 0.4 g of diphenyl phosphite was added into one of the tubes and maintained at 130° C., while the other tube was maintained at 130° C. without the addition of diphenyl phosphite. As results the mixture gelled after 24 minutes in the former tube and the whole cured after 29 minutes, whereas in the latter tube it required 60 minutes for the the mixture to gel and 70 minutes for the whole to cure, wherein the gellation means that the whole content loses its fluidability to become jelly, i.e., the mixture comes to an initial stage of three-dimensional cross-linking, and the cure means that the mixture is further cross-linked to form a solid into which a spatula or glass rod cannot be inserted.

EXAMPLE 9

A mixture of 40 g of 1,3-bis(2-oxazolinyl-2)benzene and 60 g of the same novolac resin as in Example 2 was heated in an oil bath at 180° C. The mixture melted together when it reached a temperature of 130°–150° C. Then 1.0 g of diphenyl phosphite was added to the melt, and was poured into the same mold as in Example 1 which had been in advance heated, and then was left standing at 200° C. for 1.5 hours to allow the mixture to form a cross-linked resin.

The resultant cured sheet of 3 mm in thickness was very slightly colored, transparent, infusible and undissolvable, and had the properties as follows:
Thermal deflection temperature: 137° C.
Water absorption: 0.10%
Hardness by a Barcol impressor: 59
Flexural strength: 15.4 kgf/mm$^2$
Flexural modulas: 560 kgf/mm$^2$

EXAMPLE 10

A mixture of 60 g of 1,3-bis(2-oxazolinyl-2)benzene, 40 g of the same novolac resin as in Example 2 and 5 g of phthalic anhydride was used to provide a cured sheet of 3 mm in thickness in the same manner as in Example 9.

The sheet was very slightly colored, transparent, infusible and undissolvable, and had the properties as follows:
Thermal deflection temperature: 193° C.
Water absorption: 0.17%
Hardness by a Barcol impressor: 62
Flexural strength: 13.3 kgf/mm$^2$
Flexural modulas: 517 kgf/mm$^2$

EXAMPLE 11

A mixture of 58.7 g (0.27 mole) of 1,3-bis(2-oxazolinyl-2)benzene, 37.2 g (0.163 mole) of bisphenol A and 2.7 g (0.018 mole) of phthalic anhydride was heated in an oil bath of 180° C. The mixture melted together at a temperature of about 155° C.

To the resultant melt were added 1.5 g of triphenyl phosphite and the mixture was poured into the same mold as in Example 1 which had been in advance heated, and then was left standing at 200° C. for 2 hours to allow the mixture to form a cross-linked resin.

The resultant cured sheet of 3 mm in thickness was very slightly colored, transparent, infusible and undissolvable, and had the properties as follows:
Thermal deflection temperature: 138° C.
Water absorption: 0.20%
Hardness by a Barcol impressor: 53
Flexural strength: 14.4 kgf/mm$^2$
Flexural modulas: 440 kgf/mm$^2$

EXAMPLE 12

A mixture of 60.1 g (0.28 mole) of 1,3-bis(2-oxazolinyl-2)benzene, 21.2 g (0.093 mole) of bisphenol A and 18.7 g (0.093 mole) of sebacic acid was heated in an oil bath of 170° C. When the mixture reached a temperature of about 135° C., 1.0 g of diphenyl phosphite was thereto added, and when the mixture reached a temperature of about 150° C., the whole mixture melted together to form a transparent liquid of a low viscosity.

The resultant melt was poured into the same mold as in Example 1 which had been in advance heated, and then was left standing at 180° C. The mixture was found to cure after 3 minutes. The mixtures was further left standing at 180° C. for 2 hours.

The resultant cured sheet of 3 mm in thickness was very slightly yellow, transparent, infusible and undissolvable, and was found to have a water absorption of 0.28%.

EXAMPLE 13

A mixture of 16.2 g (0.075 mole) of 1,3-bis(2-oxazolinyl-2)benzene, 11.4 g (0.05 mole) of bisphenol A and 0.14 g of p-toluene sulfonic acid monohydrate as an oxazoline ring opening polymerization catalyst was heated in an oil bath of 185° C. When the mixture reached a temperature of about 160° C., the mixture became a transparent and uniform liquid, but gelled after 1 minute when the mixture was at 180° C. Further heating of the mixture provided a very slightly yellow, transparent, infusible and undissolvable cured resin after 30 minutes.

EXAMPLE 14

A mixture of 26.0 g (0.12 mole) of 1,3-bis(2-oxazolinyl-2)benzene, 11.0 g (0.10 mole) of resorcinol and 0.37 g of diphenyl phosphite was placed in a stainless steel beaker, and was heated with stirring in an oil bath of 180° C. When the mixture reached a temperature of about 135° C., the mixture became a transparent and uniform liquid. Thereafter the temperature of the mixture raised to 1990° C., and after 3.5 minutes the mixture gelled. The temperature then decreased.

The mixture was further heated for another 45 minutes to form a completely cured resin, which was found transparent, and very slightly yellow, hard, infusible and undissolvable.

EXAMPLE 15

A mixture of 22.5 g (0.104 mole) of 1,3-bis(2-oxazolinyl-2)benzene, 9.13 g (0.04 mol) of bisphenol A, 5.52 g (0.04 mole0 of p-hydroxybenzoic acid and 0.37 g of diphenyl phosphite was placed in a stainless steel beaker, and was heated in an oil bath of 180° C. with stirring.

When the mixture reached a temperature of about 150° C., the mixture became a transparent and uniform liquid. Thereafter the temperature of the mixture reached 192° C., when the mixture gelled. The mixture was further heated for another 15 minutes in an oil bath to form a completely cured resin, which was found very slightly yellow, transparent, infusible and undissolvable.

What is claimed is:

1. A process for producing a cross-linnked resin which comprises:
reacting at least one phenolic reactant selected from the group consisting of
(a) a compound having phenolic hydroxyls and having the general formula:

wherein Ar represents a divalent aromatic group composed of single or condensed aromatic rings, or a divalent aromatic group composed of two or more aromatic rings connected by C—C covalent bond, or a divalent aromatic group composed of two or more aromatic rings connected by a divalent hydrocarbon group or a divalent group selected from the group consisting of carbonyl, thioether, ether and amide group, and wherein the aromatic ring is unsubstituted or substituted by additional hydroxyls or substituents which are inactive to a bis(2-oxazoline) compound, and
(b) a polymer having not less than two phenolic hydroxyls in the molecule, with a bis(2-oxazoline) compound in a molar ratio of the bis(2-oxazoline) compound to the phenolic reactant of not less than about 1, in the presence of a catalyst selected from the group consisting of, organic monophosphites and oxazoline ring-opening polymerization catalysts selected from the group consisting of phosphorous acid, sulfuric acid, nitric acid, hydrochloric acid, hydrogen sulfide, phenyl phosphoric acid, hydrogen sulfide, phenyl phosphoric acid, methanesulfonic acid, benzenesulfonic acid, p-toluenesulfonic acid, dodecylbenzenesulfonic acid, naphthalene-α-sulfonic acid, naphthalene-β-sulfonic acid, sulfanilic acid, phenylphosphonic acid, a sulfonic acid ester, a dialkylsulfate or an organic halide which contains at least one halomethyl group in the molecule, at elevated temperatures.

2. The process for producing a cross-linked resin as claimed in claim 1, wherein the catalyst is a monophosphite.

3. The process of producing a cross-linked resin as claimed in claim 1, wherein the oxazoline ring-opening polymerization catalyst is a strong acid, a sulfonic acid ester, a sulfuric acid ester or an organic halide which has at least one halomethyl group in the molecule.

4. The process for producing a cross-linked resin as claimed in claim 3, wherein the sulfonic acid ester is an alkyl p-toluenesulfonate.

5. The process for producing a cross-linked resin as claimed in claim 3, wherein the organic halide is a monohaloalkane.

6. The process for producing a cross-linked resin as claimed in claim 1, wherein the catalyst is used in amounts of 0.1–5% by weight based on the weight of a mixture of the bis(2-oxazoline) compound and the phenolic reactant.

7. The process for producing a cross-linked resin as claimed in claim 1, wherein the bis(2-oxazoline) compound is reacted with the phenolic reactant in the presence of about 3–95% by weight of reinforcements based on the mixture of the bis(2-oxazoline) compound and the phenolic reactant.

8. The process for producing a cross-linked resin as claimed in claim 1, wherein the bis(2-oxazoline) compound is reacted with the phenolic reactant in the presence of about 3–95% by weight of fillers based on the mixture of the bis(2-oxazoline) compound and the phenolic reactant.

9. The process for producing a cross-linked resin as claimed in claim 1, wherein the molar ratio of the bis(2-oxazoline) compound to the phenolic reactant is in the range of about 1 to about 3.

* * * * *